United States Patent [19]

Winsel et al.

[11] 4,378,413
[45] Mar. 29, 1983

[54] RECOMBINATION SYSTEM FOR STORAGE BATTERIES

[75] Inventors: August Winsel, Kelkheim; Konstantin Ledjeff, Schwalbach; Bernd-Udo Bopp, Oberursel, all of Fed. Rep. of Germany

[73] Assignee: Varta Batterie Aktiengesellschaft, Hanover, Fed. Rep. of Germany

[21] Appl. No.: 246,705

[22] Filed: Mar. 23, 1981

[30] Foreign Application Priority Data

Mar. 25, 1980 [DE] Fed. Rep. of Germany ....... 3011421

[51] Int. Cl.³ .............................................. H01M 2/00
[52] U.S. Cl. ........................................ 429/86; 429/89
[58] Field of Search .............................. 429/86, 89, 82

[56] References Cited

U.S. PATENT DOCUMENTS

| 2,471,585 | 5/1949 | Rittenhouse et al. | 429/86 |
| 2,615,062 | 10/1952 | Craig | 429/86 |
| 3,038,954 | 6/1962 | Pattison et al. | 429/86 |
| 3,832,238 | 8/1974 | Marui et al. | 429/86 |

FOREIGN PATENT DOCUMENTS 1484427 9/1977 United Kingdom .

Primary Examiner—Anthony Skapars
Attorney, Agent, or Firm—Weiser, Stapler & Spivak

[57] ABSTRACT

A recombination system for catalytic oxidation of hydrogen in storage battery gases includes a gas supply duct which makes it possible for the combustible gas flowing through it to aspirate from the ambient the necessary combustion air, following the principle of a Bunsen burner, and to entrain it to the recombination catalyst. In case of over-supply of gas, an acid separator positioned in the gas supply pipe counteracts the gas aspiration by means of its flow impedance and thereby makes the recombination system safe from overload. It can also be connected following a conventional recombiner, thereby increasing its effectiveness, by receiving the excess hydrogen from same and reacting it with the aid of the air aspiration.

10 Claims, 2 Drawing Figures

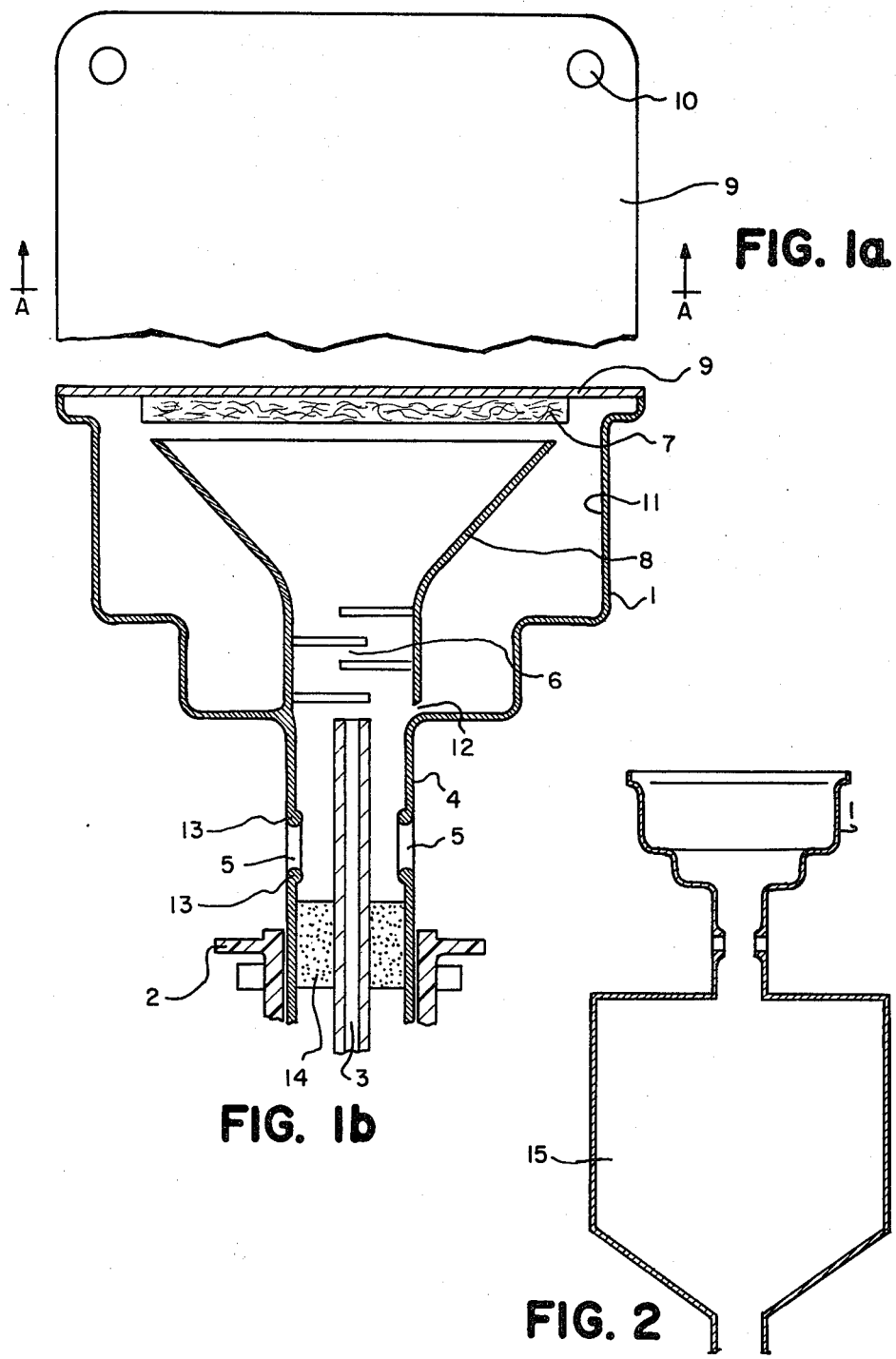

RECOMBINATION SYSTEM FOR STORAGE BATTERIES

The invention relates to a recombination system for the catalytic oxidation of hydrogen in storage battery gases, which is positioned on top of the storage battery and connected with same through a gas supply.

A known system of this type is, for example, the closure plug for lead storage batteries which is described in German Patent Publication (Offenlegungsschrift) No. 2,442,465 and British patent specification No. 1,484,427.

For complete catalytic oxidation the electrolysis gases, hydrogen and oxygen, must be present in a volumetric relationship of 2 to 1, corresponding to the stoichiometry of water. In the operation of a storage battery, however, these two gases are evolved in approximately the above-mentioned relationship only during conditions of permanent over-charge. During most other operating phases the gas evolution is not stoichiometric, but normally richer in oxygen during changing and richer in hydrogen during discharging and possibly also during rest periods. As a result, particularly during discharging, much excess hydrogen evolves. Due to the missing oxygen equivalent, this was not capable of being reacted in previously known recombiners. The result is a loss of electrolyte liquid.

It is true that the interior of the recombiner is connected with the ambient air through an outlet aperture. However, this aperture is always constructed as a flow impedance to prevent the outflow of the water vapor which forms. Conversely, however, not much air is capable of flowing into the recombiner through this flow impedance.

Accordingly, it is an object of the present invention to provide a recombination system for hydrogen and if appropriate also for other combustible gases, which is able, even when there is insufficient oxygen supply entrained by the combustible gases, to insure complete reaction of all combustible gas components.

This and other objects which will appear are achieved by enabling the gas supply conduit to aspirate, into the combustible gas flowing through it, ambient air through an aperture to the ambient, and to do so automatically and entrain same.

For further details reference is made to the discussion which follows in light of the accompanying drawings wherein FIG. 1a shows a fragmentary top view of a system embodying the invention looking down on its lid;

FIG. 1b shows a cross-section of the same system in a plane defined by the line A—A in FIG. 1a; and FIG. 2 diagrammatically illustrates the use of the invention in a dual recombination system.

According to FIG. 1b the gas supply conduit, which connects the recombiner 1 with the filler sleeve 2 of a storage battery cell is composed of two concentrically arranged pipes, the inner gas inlet pipe 3 and the outer connecting pipe 4.

Through the apertures 5 in connecting pipe 4, the gas supply conduit is provided with an opening to the outside which enables the combustible gas flowing upwardly in gas inlet pipe 3 to aspirate combustion air and to entrain it into the recombiner. This makes use of the operating principle of the known Bunsen burner. In it, illuminating gas flows out of a nozzle positioned at the foot of the burner and thereby automatically aspirates air through adjustable openings. As a result, there arises in the interior of the combustion pipe (chimney) located above the nozzle a mixture of air and illuminating gas which is burned upon ignition of a flame which is located upon the upper rim of the combustion pipe.

The combined gas current traverses the gas labyrinth 6 and impinges upon the catalyst carrier 7. The funnel 8 provides for uniform distribution of the gases over the surface of the catalyst carrier which may, for example, be a hydrophobic asbestos fiber mat.

Due to the heat of reaction, the reaction gases which now consist of water vapor and air or rather nitrogen are subjected to a pronounced density change and consequently to a strong lifting effect. In so doing, the outlet openings 10 in recombiner lid 9 provide for upward escape. The hot gas which flows from the catalyst carrier in this manner produces a suction in the connecting pipe 4 which allows constant resupply of ambient air through apertures 5.

At least a portion of the water vapor formed condenses upon the inner wall 11 of the recombiner. The condensate water flows back into the cell through aperture 12 and connecting pipe 4. In order that it not escape to the outside through apertures 5, these are provided with an internal welt 13. Below apertures 5, the annular slot which exists between gas supply inlet pipe 3 and connecting pipe 4 is filled by a porous body 14. This causes the pressure relationships to become such that the liquid pressure on porous body 14 is always higher than in gas inlet pipe 3. This forces the gas to flow only through that pipe.

In order to recover the recombination water as completely as possible, cooling pipes (not shown) can, for example, be applied to the outlet openings 10 in the recombiner lid from which there ultimately escapes only the available excess air mixed with nitrogen.

The recombiner is made safe from overloads by the application of a flow impedance. The flow impedance is negligible during operation at rated capacity but increases sharply with higher gas supply. This characteristic is achieved by suitable choice of the internal diameter of gas inlet pipe 3 which may account to, for example, 2 mm, and through attachment of a plate above the end of the pipe. This plate can, for example, be the first deflection stage of the gas labyrinth 6. The space between pipe end and plate of, e.g. 4 mm and the diameter of the pipe must be precisely matched to each other. This has the result that the gas flows freely into the recombiner during operation at rated capacity. On the other hand, during overload the major portion is reflected back even ahead of the gas labyrinth and flows out through holes 5. Thus, the air aspiration apertures 5 simultaneously perform a valve function. This arrangement for obtaining the desired flow impedance, to the extent that it extends to the gas inlet pipe 3 and the first deflection stage of gas labyrinth 6, can also serve as acid separator in accordance with the operating principle known from German Patent Publication (Offenlegungsschrift) No. 2,621,413 and British Patent Specification No. 1,519,946. According to these printed publications the cell gases flow into the recombiner through a nozzle and in so doing are deflected by an impingement plate which is located close before the nozzle aperture. The inertia-possessing liquid droplets which are entrained in the gas stream do not follow this deflection and are precipitated on the impingement plate.

The liquid separation can be optimized by selection of the spacing between plate and nozzle aperture, as well as the diameter of the nozzle. A very desirable value for the internal diameter of the nozzle has been found to be 0.5 mm and for the spacing between nozzle aperture and plate 2 mm. Due to lower gas passage velocity, larger nozzle diameters reduce the inertia effect of the liquid droplets and are therefore less effective. In practice, the diameter of the gas inlet pipe and the space between pipe end and first deflection stage is so dimensioned, in a recombiner system according to the present invention, that an optimum compromise is obtained for both requirements, namely low flow impedance at rated capacity and efficient acid separation.

Because a substantial nitrogen ballast reaches the recombiner embodying the invention together with the aspirated air, its effectiveness is necessarily less than in a conventional recombiner which can react 100% of the recombinable gases provided there is not an excess supply of hydrogen, for example. In that case, a conventional recombiner of preferably greater dimensions can suitably be supplemented by a recombiner embodying the present invention to form a dual recombiner system.

Such a system is diagrammatically illustrated in FIG. 2. There, the gas inlet of the recombiner 1 embodying the invention is connected to the gas outlet of a large reactor or recombiner 15 of known construction, i.e., without air aspiration. The larger recombiner is so dimensioned that it alone can react even those quantities of hydrogen which occur during peak loads corresponding to charging and overcharging. The only limiting effect is the oxygen which is entrained as oxidant in the charging gases. Once this is consumed, the excess hydrogen leaves the recombiner 15 and flows over its gas outlet into the reactor 1 with accompanying air aspiration. There its oxidation is carried to completion using the oxygen from the air. The condensed water vapor flows back into the large reactor 15 or into the cell.

The dual recombiner system is therefore particularly suitable to accommodate the often highly variable quantity relationships between combustible gas and oxygen—the hydrogen component of the cell gas evolution can vary between 95 and 30% by volume—in that only the excess hydrogen is oxidized with lower efficiency in the recombiner embodying the invention. As far as the overall system is concerned, this experiences a further improvement in efficiency by operating in this manner.

In lieu of a horizontally positioned catalyst mat, the catalyst can also completely or partially fill the internal wall of an inserted pipe, thereby enhancing the chimney effect. In such a case it generally suffices to use as the condensing surface the outer wall of the pipe in the region which is not covered by the catalyst. In addition, the condensing surface can be provided with a wick for return of the water into the cell enclosure.

We claim:

1. Recombiner system for the catalytic oxidation of hydrogen in storage battery gases, said system being applied to the storage battery and connected to it by a gas supply duct, wherein the gas supply duct comprises a gas inlet pipe and a connecting pipe having a larger diameter and being concentrically positioned with respect to the gas inlet pipe, the connecting pipe having apertures to the outside which provide for automatic aspiration and entrainment of ambient air by the combustible gas flowing through the duct.

2. The system of claim 1 comprising a lid having outlet apertures.

3. The system of claim 1 comprising an annular slot between the gas inlet pipe and the connecting pipe, said slot being filled with a porous body below the apertures.

4. The system of claim 1 wherein the gas supply is connected to the gas outlet of an additional recombiner system upstream from the system of claim 1.

5. The system of claim 1 wherein the apertures are below the upper end of the gas inlet pipe.

6. A system of claim 1 wherein the apertures have internal surrounding welts to prevent to prevent the escape through the apertures of recombined liquid flowing down the inner wall of the connecting pipe.

7. The system of claim 1 further including an upwardly diverging funnel extending upwardly from the gas supply duct toward the recombiner catalyst.

8. The system of claim 1 further including a labyrinth in the path of the gas flow from the gas inlet pipe to the recombiner catalyst.

9. The system of claim 1 further including means providing a flow impedance to reflect gas toward the apertures during overload.

10. The system of claim 3 wherein the porous body provides during operation of the system a gas seal between the gas inlet pipe and the connecting pipe.

* * * * *